UNITED STATES PATENT OFFICE

JAMES BADDILEY, PERCY CHORLEY, AND RAINALD BRIGHTMAN, OF BLACKLEY, MANCHESTER, ENGLAND, ASSIGNORS TO BRITISH DYESTUFFS CORPORATION LIMITED, OF BLACKLEY, MANCHESTER, ENGLAND

DYEING REGENERATED CELLULOSE SILK

No Drawing. Original application filed May 21, 1927, Serial No. 193,376, and in Germany May 2, 1927. Divided and this application filed July 6, 1928. Serial No. 290,882.

In our copending application Serial No. 193,376 of which this application is a division, we have described the preparation of new secondary disazo dyes by coupling diazotized aminoazo compounds, (including their homologues, derivatives and the sulphonic or carboxylic acids thereof in this term) in alkaline or acid media with sulphonic acids of 2-amino-8-naphthol of the type

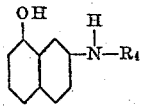

wherein $R_4$ represents alkyl or acyl group or benzene or naphthalene residue which are free from amino substituent. The secondary disazo dyestuffs produced by this method are characterized by the following general formula

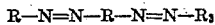

wherein R represents a benzene or naphthalene residue and $R_3$ represents a coupled 2-amino-8-naphthol sulphonic acid. of the type

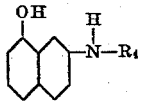

wherein $R_4$ represents alkyl or acyl group or benzene or naphthalene residue which are free from an amino substituent.

We have found that the secondary disazo dyes prepared by the methods disclosed in our acknowledged application Ser. No. 193,376 and having the above characteristic general formula, possess the valuable property of dyeing regenerated cellulose silks, such as viscose silk, in even level shades. These dyestuffs may be applied to a variety of fabrics, for example to wool, cotton or regenerated cellulose silks. Some of these dyestuffs are better adapted for one type of fabric or fiber while others are better suited for another type of fabric or fiber. However, the most important, valuable and surprising discovery is that all of the dyestuffs of this general class will dye regenerated cellulose silks in even level shades. In this resides the most valuable part of our invention. The following description is typical of the application of the dyestuffs of the general class set forth above to regenerated cellulose.

*Example A.*—Dyebath is made up from 3,000 parts of water and 6 parts of the dyestuff obtained by combining aminosalicylic acid with α-naphthylamine, rediazotizing and combining with 8-hydroxy-2:2'-dinaphthylamine-3:6-disulphonic acid. This dyestuff has in the form of a free acid the probable formula

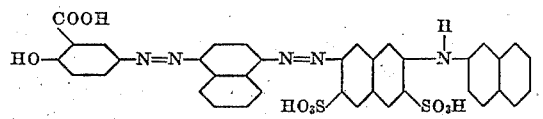

100 parts of viscose silk are entered into the bath cold, after which the bath is heated up to boil, 30 parts of Glauber's salt are added and dyeing is allowed to proceed at or near to the boil for about ½ hour. Soap may be added to the dyebath if desired. The dyeing obtained is a level deep blue-black shade.

A level brown shade may be obtained in a similar manner by using the dyestuff obtained by diazotizing p-aminoazobenzene-p'-sulphonic acid and coupling it in alkaline solution 2-phenylamino-8-naphthol-6-sulphonic acid. This dyestuff has in the form of the free acid the probable formula

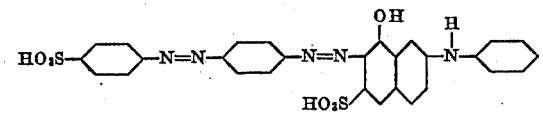

Our invention is further illustrated by the examples of dyeings in which the dyestuffs and the corresponding shades on viscose silks obtained are quoted in the following table:—

| Disazo colour from— | | Shade on viscose silk |
|---|---|---|
| Aminoazo compound diazotized | N-substitution product of 2-amino-8-naphthol sulphonic acid | |
| m-xylidine sulphonic acid m-amino-p-cresol methyl ether | 2-phenylamino-8-naphthol-6-sulphonic acid | Violet-black |
| Aminosalicylic acid α-naphthylamine | 2-phenylamino-8-naphthol-6-sulphonic acid | Black |
| Aminoazobenzene | 2-phenylamino-8-naphthol-6-sulphonic acid | Brown |
| p-aminoazobenzene-p'-carboxylic acid | 2-phenylamino-8-naphthol-6-sulphonic acid | Brown |
| p-aminoazobenzene-p'-sulphonic acid | 2-o-methoxyphenylamino-8-naphthol-6-sulphonic acid | Brown |
| p-aminoazobenzene-p'-sulphonic acid | 2-(2':4'-dinitro) phenylamino-8-naphthol-6-sulphonic acid | Red-brown |
| p-aminoazobenzene-p'-sulphonic acid | 2-ethylamino-8-naphthol-6-sulphonic acid | Olive-brown |
| p-aminoazobenzene-p'-sulphonic acid | 2-benzoylamino-8-naphthol-6-sulphonic acid | Brown |
| p-aminoazobenzene-p'-sulphonic acid | 2-acetylamino-8-naphthol-6-sulphonic acid | Red-brown |
| p-aminoazobenzene-p'-sulphonic acid | 8-hydroxy-2-naphthylglycine-6-sulphonic acid | Orange-brown |
| 2-napththylamine-4 : 8-disulphonic acid α-naphthylamine | 2-phenylamino-8-naphthol-6-sulphonic acid | Navy-blue |
| Aniline-1-naphthylamine-6-sulphonic acid | 2-phenylamino-8-naphthol-6-sulphonic acid | Blue-black |

What we claim and desire to secure by Letters Patent is:—

1. The process of dyeing regenerated cellulose materials in even level shades, which comprises applying to the said regenerated cellulose materials the secondary disazo dyestuffs having the following general formula $$R-N=N-R-N=N-R_3$$

wherein R represents a benzene or naphthalene residue and $R_3$ represents a coupled 2:amino-8-naphthol sulphonic acid of the type

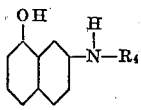

wherein $R_4$ represents alkyl or acyl group or benzene or naphthalene residue which are free from an amino substituent, the said regenerated cellulose materials being thereby dyed in even level shades.

2. As new materials, the regenerated cellulose materials dyed with a secondary disazo dyestuff having the following formula $$R-N=N-R-N=N-R_3$$

wherein R represents a benzene or naphthalene residue and $R_3$ represents a coupled 2-amino-8-naphthol sulphonic acid of the type

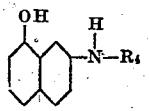

where $R_4$ represents alkyl or acyl group or benzene or naphthalene residue which are free from an amino substituent, the said dyed regenerated cellulose material having an even level shade.

3. As new materials, the regenerated cellulose materials dyed with a secondary disazo dyestuff having the following formula $$R-N=N-R-N=N-R_3$$

wherein R represents a benzene or naphthalene aryl residue free from hydroxyl groups and $R_3$ represents a coupled 2-amino-8-naphthol sulphonic acid of the type

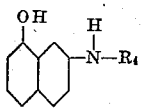

wherein $R_4$ represents alkyl or acyl group or benzene or naphthalene residue which are free from amino substituents, the said dyed regenerated cellulose material having an even level shade.

4. As new materials, the regenerated cellulose materials dyed with a secondary disazo dyestuff having the following formula $$R-N=N-R-N=N-R_3$$

in which R represents a benzene or naphthalene residue and $R_3$ represents a coupled 2-amino-8-naphthol sulphonic acid of the type

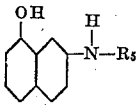

wherein $R_5$ represents alkyl group or a benzene or naphthalene residue which are free from amino substituents, the said dyed regenerated cellulose material having an even level shade.

5. As new materials, the regenerated cellulose materials dyed with a secondary disazo dyestuff having the following formula $$R_1-N=N-R-N=N-R_3$$

wherein $R_1$ represents a benzene residue free from hydroxyl groups, R represents a benzene or naphthalene residue and $R_3$ represents coupled 2-amino-8-naphthol sulphonic acid of the type

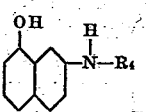

wherein $R_4$ represents alkyl or acyl group or a benzene or naphthalene residue which are free from amino substituents, the said dyed regenerated cellulose having an even level shade.

6. As new materials, the regenerated cellulose materials dyed with a secondary disazo dyestuff having the following formula

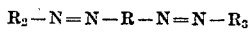

wherein $R_2$ represents a benzene residue containing a sulphonic or carboxylic acid group, R represents a benzene or naphthalene residue and $R_3$ represents a 2-amino-8-naphthol sulphonic acid of the type

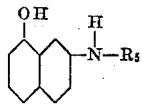

wherein $R_5$ represents alkyl group or benzene or naphthalene residue which are free from amino substituents and in which at least one sulphonic acid group is connected to the 2-amino-8-naphthol nucleus in the sixth position, the said dyed regenerated cellulose material having an even level shade.

7. As new materials, the regenerated cellulose materials dyed with a secondary disazo dyestuff having the following formula

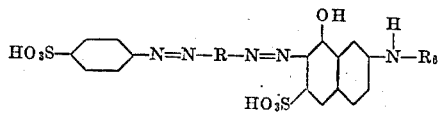

wherein R represents a benzene or naphthalene residue and $R_6$ represents a benzene or naphthalene residue which is free from amino substituents, the said dyed regenerated cellulose material having an even level shade.

8. As new materials, the regenerated cellulose materials dyed with a secondary disazo dyestuff having the following formula

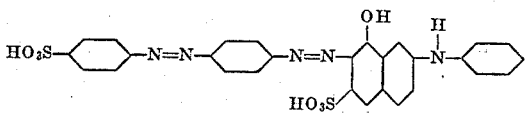

said dyestuff being a black powder dissolving in water to give a dark brown solution; addition of dilute mineral acids to this solution producing a reddish shade with a deposition of a brown precipitate, addition of dilute caustic soda causing the solution to become greenish, the dyestuff dissolving in concentrated sulphuric acid to a bright greenish-blue solution yielding on dilution with water a brown para-phenylene-diamine sulphanilic acid and 7-amino-2-phenylamino-8-naphthol-6-sulphonic acid, the said dyed regenerated cellulose material having an even level shade.

In testimony whereof we affix our signatures.

JAMES BADDILEY.
PERCY CHORLEY.
RAINALD BRIGHTMAN.